Nov. 27, 1928.

A. VAN VEEN ET AL 1,693,263

TRIMMER

Filed Oct. 15, 1923

INVENTORS:
Anton Van Veen
Horace H. Fitzgerald
BY
Arthur C. Jenkins,
ATTORNEY.

Nov. 27, 1928.
A. VAN VEEN ET AL
1,693,263
TRIMMER
Filed Oct. 15, 1923     3 Sheets-Sheet 2
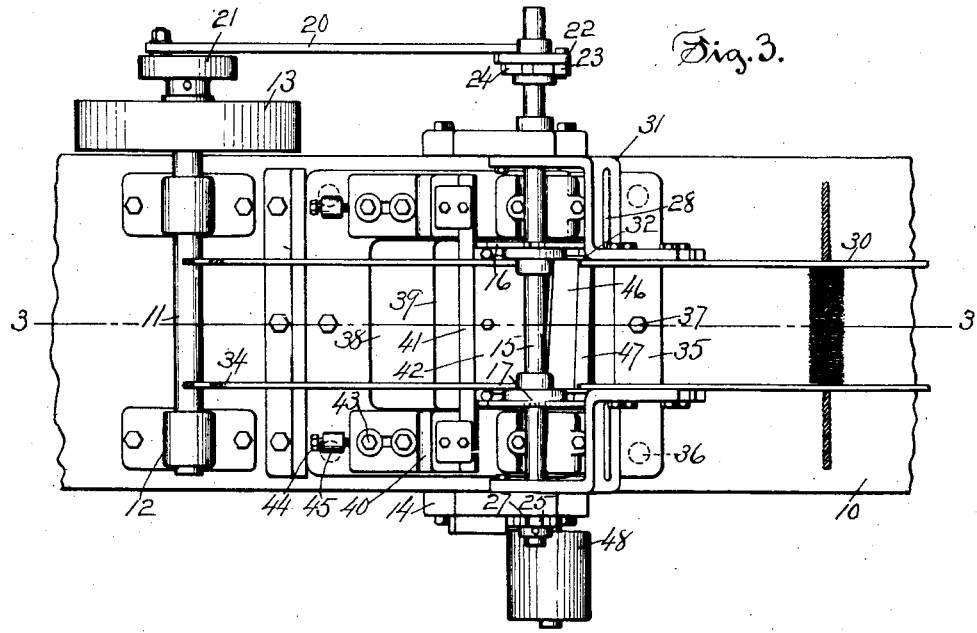
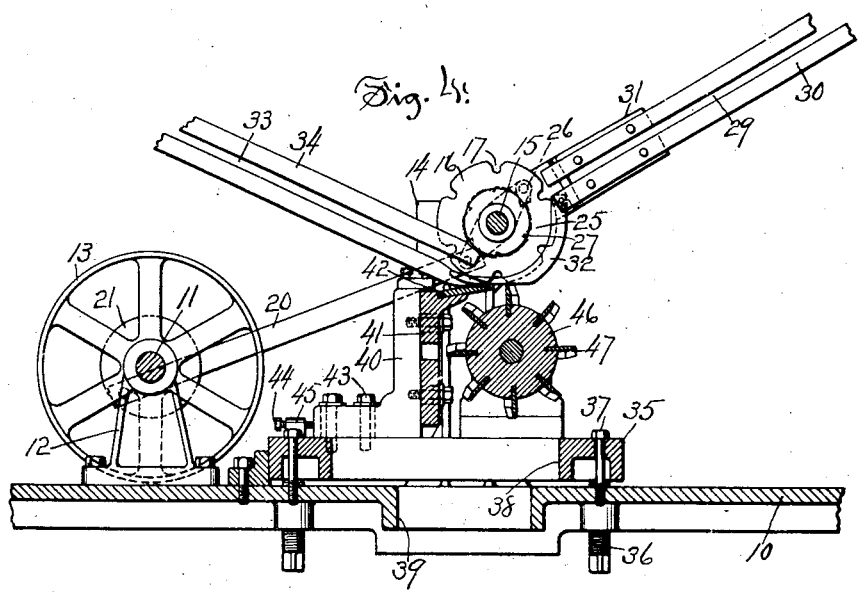
INVENTORS:
Anton Van Veen
Horace H. Fitzgerald
BY
Arthur Jenkins,
ATTORNEY.

Nov. 27, 1928.
A. VAN VEEN ET AL
1,693,263
TRIMMER
Filed Oct. 15, 1923   3 Sheets-Sheet 3
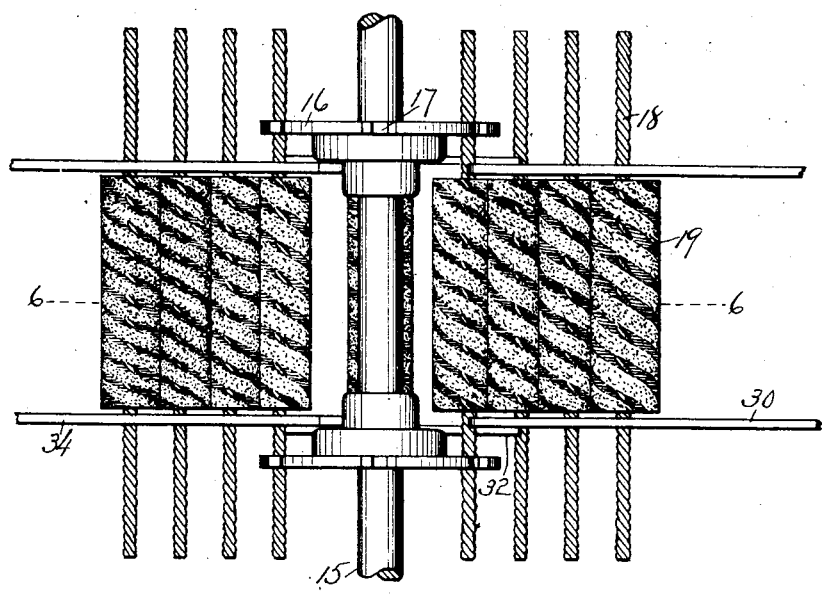
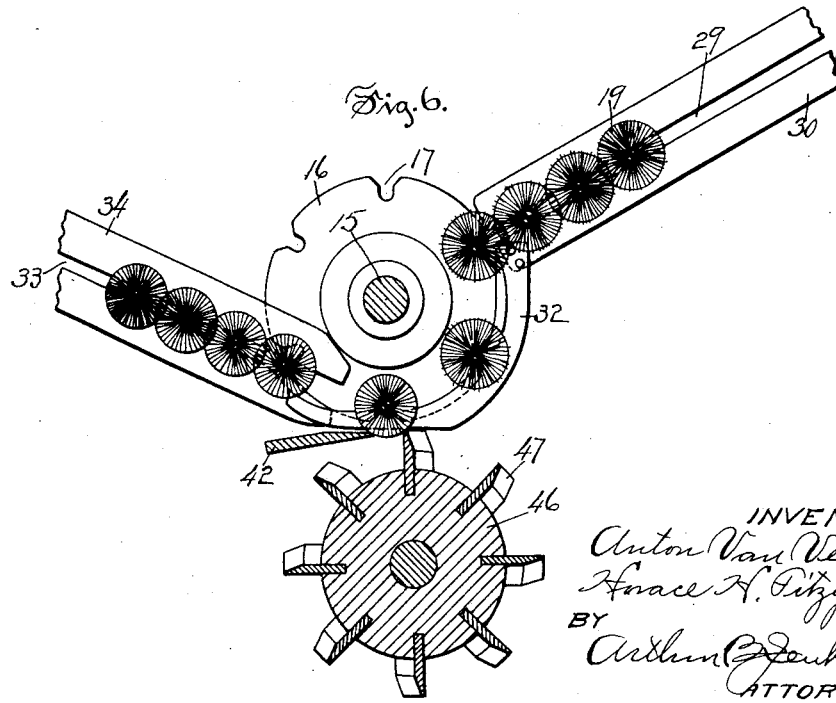
INVENTORS:
Anton Van Veen,
Horace H. Fitzgerald
BY Arthur B. Jenkins,
ATTORNEY.

Patented Nov. 27, 1928.

1,693,263

UNITED STATES PATENT OFFICE.

ANTON VAN VEEN, OF HARTFORD, AND HORACE H. FITZGERALD, OF BERLIN, CONNECTICUT, ASSIGNORS TO THE FULLER BRUSH COMPANY, OF HARTFORD, CONNECTICUT, A CORPORATION OF CONNECTICUT.

TRIMMER.

Application filed October 15, 1923. Serial No. 668,549.

This invention relates more especially to machines for trimming the material of which brushes are composed, and an object of the invention, among others, is to provide a machine of this class in which the brushes are automatically fed to and carried away from the trimming devices; and a further object of the invention is to provide a machine by the use of which the brushes shall be rapidly trimmed in a most efficient manner.

One form of machine embodying the invention and in the construction and use of which the objects herein set out, as well as others, may be attained, is illustrated in the accompanying drawings, in which—

Figure 3 is a top view of said machine.

Figure 4 is a view in vertical section on a plane denoted by the dotted line 4—4 of Figure 3.

Figure 5 is a detail top view, scale enlarged, of the feeding mechanism.

Figure 6 is a view in vertical section on a plane denoted by the dotted line 6—6 of Figure 5.

Figure 1:
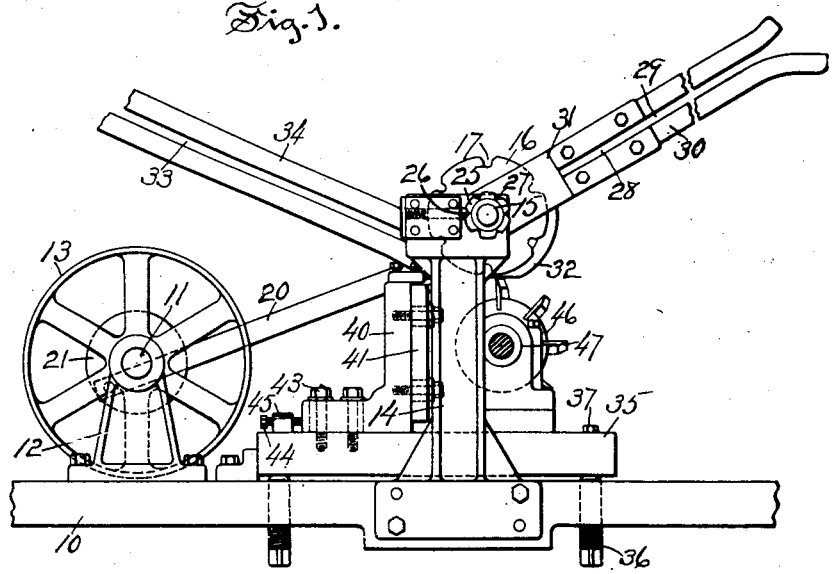
Figure 1 is a side view of a machine embodying this invention, one of the driving pulleys being removed.

In the accompanying drawings the numeral 10 denotes the base plate of this machine that is of any desirable form and material, and which may rest upon a table or other suitable support, not herein shown. A driving shaft 11 for the feed mechanism is mounted in bearings on posts 12 secured to and rising from the base plate 10, said driving shaft having a pulley 13 secured thereto and adapted to receive a belt from any suitable source of power.

Standards 14 are secured to opposite sides of the base plate, rising therefrom, these standards being provided at their upper ends with bearings for a feed shaft 15 to which carrier discs 16 are secured, said discs having notches 17 evenly spaced about the periphery of each disc to receive the projecting ends 18 of brushes 19 to be acted upon by the trimming mechanism to be hereinafter described.

The feed shaft has a step-by-step rotating movement imparted to it by means of a pitman 20 connected at one end with a crank disc 21 secured to the driving shaft 11, and at its opposite end to a pawl supporting lever 22 rotatably mounted on the shaft 15 and carrying a pawl 23, the end of which engages the teeth of a ratchet wheel 24 secured to the shaft 15. By this mechanism as the crank disc is rotated an oscillating movement is imparted to the lever 22 and the pawl 23, and thereby a step-by-step movement is conveyed to the feed shaft 15.

A positioning disc 25 is secured to the shaft 15, preferably on the opposite side of the machine from the ratchet wheel 24, and a detent 26 is spring pressed toward the positioning disc to engage notches 27 therein. In the preferred form of construction these notches are beveled to receive the beveled end of the detent, this beveled construction of the notches and detent being for the purpose of positioning the shaft 15 and consequently the carrier discs 16, in the step-by-step movements of the latter, to locate the notches 17 in the carrier discs in line with slots 29 in the side parts 30 of a feed chute, whereby the brushes 19 having the projecting ends of their cores located in the slots 29 will be moved into the notches 17 as the carrier discs are rotated.

The sides 30 of the feed chute are each rigidly secured to one end of an offset bracket 31, the opposite ends of said brackets being rigidly secured to the inner faces of the standards 14, and as clearly shown in Figure 3 of the drawings, said brackets having slots 28 registering with the slots 29 in the feed chute to permit movement therealong of the projecting ends 18 of the brushes. Ways 32 are located underneath the carrier discs 16, said ways being secured to the side parts 30 of the feed chute and extending downwardly and forwardly underneath the discs to receive the projecting ends or stems of the brushes and retain them within the slots 17. The free ends of these ways terminate in a position to guide the brushes into slots 33 of a delivery chute 34 constructed similarly to the feed chute hereinbefore described and along which delivery chute the brushes are forced by the movement of the succeeding brushes caused by the step-by-step rotation of the carrier discs. The ways 32 are so arranged that the stems of the brushes will be loosely held so that they may be freely rotated in the notches 17 for a purpose to be hereinafter described.

Figure 2:
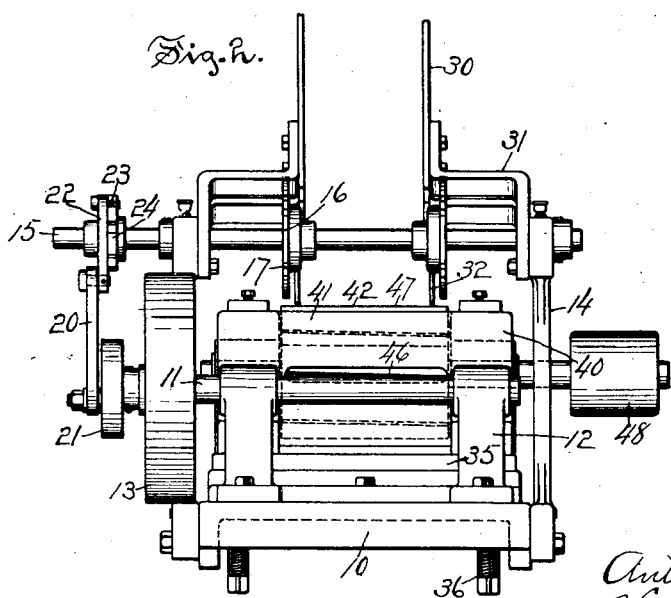
Figure 2 is an end view of the same, with the delivery chute omitted.

A cutter base 35 is mounted upon adjustable supports 36 in the form of screws threaded into the base plate 10, and as shown in Figures 1, 2 and 4 of the drawings. The cutter base is held in position as by means of holding screws 37 passing through the cutter base and into the base plate 10. This cutter base has an opening 38 through which the material trimmed from the brushes may pass downwardly and through an opening 39 in the base plate 10. Brackets 40 are secured to the cutter base 35 at opposite sides thereof, said brackets projecting upwardly and having secured thereto a support 41 for a stationary cutter blade 42. The brackets 40 are adjustable horizontally on the cutter base 35, as by means of bolts 43 passing through slots in the cutter base, and adjusting screws 44 passing through lugs 45 rising from the upper surface of the cutter base. The stationary cutter blade is secured to a shelf extending forwardly from the support 41, and as shown in Figure 4 of the drawings.

A cutter cylinder 46 is rotatably mounted in the supports on the cutter base 35, this cylinder having cutter blades 47 that are carried in a circular path in cutting relation with respect to the stationary cutter blade 42, and as shown in Figure 6 of the drawings. The shaft of the cutter cylinder has a pulley 48 secured thereto by means of which the cutters are driven as by a belt extending from any suitable source of power.

The cutter blades 47 are so mounted that they will make contact with the bristles of the brushes 19 at some distance from the edge of the stationary cutter blade 42. This imparts a rotary movement to the brush 19 being operated upon by the cutter blades, this rotary movement of the brushes being imparted by each of the cutter blades 47 and consequently each brush being operated upon is rotated to such extent that cutting operation of the blades 47 is insured throughout the entire circumference of each brush with a result that each brush is evenly trimmed throughout its entire peripheral surface.

This trimming device is of particular advantage in that it is so constructed that the brushes may be operated upon and trimmed during a feeding operation of the brushes to a machine for performing a subsequent operation, the feed and delivery chutes together comprising a feed chute for such subsequent mechanism (not shown herein), and the trimming operation takes place during a pause in the passage of the brushes along said chutes, which pause would be necessitated even tho the trimming operation was not effected at this time.

The carrier discs 16 are, in effect, combined feed and carrier discs and it will be obvious that such discs may be employed for feed purposes whether the trimming operation is or not performed while the brushes are being moved by such discs.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:—

1. A trimming machine for cylindrical brushes including a feed member movably mounted and having means to engage said brushes and move them forward while permitting free rotation thereof, a trimming device comprising a number of cutters with their cutting edges spaced apart and movable in the path of the periphery of said brush to strike it with force and give it a whirling motion, means for operating the trimming device, and means for imparting step-by-step movement to said feed member to cause a dwell in such movement with a brush in engagement with the trimming device.

2. A trimming machine for cylindrical brushes including a feed member rotatably mounted and having means to engage said brushes and move them forward while permitting free rotation thereof, a trimming device comprising a number of cutters rotatably mounted in the path of movement of a brush carried by said feed member to strike said brush with force and give it a whirling motion, means to impart rotation to said trimming device, and means for causing a dwell in the movement of said feed member with a brush in contact with said trimming device.

3. A trimming machine for cylindrical brushes including a feed member rotatably mounted and having notches to receive for free rotation therein brushes to be trimmed, ways positioned at the periphery of said feeding member to retain brushes in said notches to permit said free rotation thereof, a trimmer rotatably mounted and comprising a number of cutting blades positioned in the path of movement of the periphery of said brushes in said feed member to strike said brushes with force and give them a whirling motion, and means for causing a dwell in the movement of said feed member with a brush therein in contact with said cutting blades.

4. A trimming machine for cylindrical brushes including a feed member movably mounted and having means to engage said brushes and move them forward while permitting free rotation thereof, a trimming device comprising a number of cutters spaced apart and movable past said feed member to strike said brushes with force and give them a whirling motion during trimming action, and means for causing movement of said trimming device.

5. A trimming device for cylindrical brushes including a feed member rotatably mounted and having means to engage said brushes and move them forward while permitting free rotation thereof, a trimming device comprising a number of cutters spaced apart and rotatably mounted and movable past said feed member to strike said brushes with force and give them a whirling motion during the trimming action, and means for rotating said trimming device.

6. A trimming device for cylindrical brushes including a feed member rotatably mounted and having notches to receive for free rotation therein brushes to be trimmed, ways positioned at the periphery of said feeding member to retain brushes to permit rotation thereof in said notches, and a trimmer rotatably mounted and comprising a number of cutting blades spaced apart and positioned to strike said brushes with force and give them a whirling motion during such trimming action.

7. A trimming machine for fiber bristle brushes including a feed member movably mounted and having notches to receive brushes for free rotation thereof to move them forward to be trimmed, means for imparting step by step movement to said feed member to retain said brushes in fixed positions for trimming, a feed chute having slots for movement of brushes therealong to said feed member, and a trimmer rotatably mounted and comprising a number of cutting blades spaced apart to strike said brushes with force and give them a whirling motion during such trimming action.

8. A trimming machine for fiber bristle brushes including a feed member movably mounted and having means to engage said brushes and move them forward while permitting free rotation thereof, means for imparting step-by-step movement to said feed member to retain said brushes in a definite position for trimming, means to retain said feed member in its position of rest, and a trimming device comprising a number of cutting blades movable past said feed member to strike said brushes with force and give them a whirling motion during the trimming action.

9. A trimming machine for cylindrical brushes including a feed member movably mounted and having means to engage said brushes and move them forward while permitting free rotation thereof, a trimming device comprising a number of cutters spaced apart and movable past said feed member to strike said brushes with force and give them a whirling motion during trimming action, means for causing movement of said trimming device, and a cutting blade operatively positioned with respect to and spaced from said trimming device.

10. A trimming machine for cylindrical brushes including a feed member movably mounted and having means to engage said brushes and move them forward while permitting free rotation thereof, a trimming device comprising a number of cutters movable past the feed members to strike said brushes with force and give them a whirling motion during the trimming action, means for causing movement of said trimming device, a cutting blade operatively positioned with respect to and spaced from said trimming device, and means for adjusting the relative position of said trimming device and said cutting blade toward and from each other to accommodate brushes of various sizes.

11. A feed device for a machine for trimming cylindrical brushes, said device comprising a feed chute, a delivery chute, a carrier movably mounted to receive brushes from said feed chute and conduct them to said delivery chute, said delivery chute extending tangentially to and in the same direction as said carrier for reception of brushes moved into said delivery chute by said carrier, and means for performing an operation upon said brushes while located in said carrier.

ANTON VAN VEEN.
HORACE H. FITZGERALD.